United States Patent
Nakanishi et al.

(10) Patent No.: US 10,190,884 B2
(45) Date of Patent: Jan. 29, 2019

(54) NAVIGATION SYSTEM, POI PRESENTATION METHOD, POI PRESENTATION PROGRAM, AND RECORDING MEDIUM

(71) Applicants: Toyota Mapmaster Incorporated, Nagoya-shi (JP); Toyota Jidosha Kabushiki Kaisha, Toyota-shi (JP)

(72) Inventors: Kenta Nakanishi, Nagoya (JP); Satoru Deguchi, Nagoyga (JP); Atsushi Inoue, Toyota (JP); Kazuhito Baba, Nagoya (JP)

(73) Assignees: Toyota Mapmaster Incorporated (JP); Toyota Jidosha Kabushiki Kaisha (JP)

(*) Notice: Subject to any disclaimer, the term of this patent is extended or adjusted under 35 U.S.C. 154(b) by 58 days.

(21) Appl. No.: 15/459,150

(22) Filed: Mar. 15, 2017

(65) Prior Publication Data
US 2017/0268893 A1 Sep. 21, 2017

(30) Foreign Application Priority Data
Mar. 16, 2016 (JP) ................. 2016-052574

(51) Int. Cl.
*G01C 21/34* (2006.01)
*G06F 17/30* (2006.01)
*G06N 5/04* (2006.01)

(52) U.S. Cl.
CPC ... *G01C 21/3476* (2013.01); *G06F 17/30241* (2013.01); *G06N 5/04* (2013.01)

(58) Field of Classification Search
CPC .. G01C 21/3476; G06N 5/04; G06F 17/30241
See application file for complete search history.

(56) References Cited

U.S. PATENT DOCUMENTS 9,811,564 B2* 11/2017 Ishiguro ............ G06F 17/30528
2010/0023259 A1* 1/2010 Krumm .................. G01C 21/20
701/532

(Continued)

FOREIGN PATENT DOCUMENTS

JP 2004-206614 7/2004
JP 2009-175775 8/2009

(Continued)

OTHER PUBLICATIONS

Notification of Reasons for Refusal dated Apr. 24, 2018, of corresponding Japanese Application No. 2016-052574 in English.

(Continued)

*Primary Examiner* — Mussa A Shaawat
(74) *Attorney, Agent, or Firm* — DLA Piper LLP (US)

(57) ABSTRACT

A navigation system includes: a search unit; an acquisition unit; a storage unit; a collection unit configured to collect one or more types of popularity information for specifying a popularity level indicating a level of popularity of each POI; a calculation unit configured to calculate the popularity level of each POI on the basis of the collected popularity information; a specification unit configured to specify the POIs having high popularity levels located within a predetermined distance from the route searched for by the search unit; and a presentation unit configured to present one POI specified by the specification unit before traveling near the corresponding POI, and the calculation unit calculates the popularity level on the basis of a deviation value calculated on the basis of the one or more types of popularity information and popularity information on other POIs included within a first predetermined range from the corresponding POI.

11 Claims, 9 Drawing Sheets

(56) References Cited

U.S. PATENT DOCUMENTS

| | | | |
|---|---|---|---|
| 2010/0131187 A1* | 5/2010 | Lai | G01C 21/32 |
| | | | 701/532 |
| 2012/0047129 A1 | 2/2012 | Redstone et al. | |
| 2012/0303272 A1* | 11/2012 | Studzinski | G01C 21/32 |
| | | | 701/450 |
| 2013/0073988 A1* | 3/2013 | Groten | G06Q 30/02 |
| | | | 715/753 |
| 2013/0261957 A1* | 10/2013 | Mahapatro | G01C 21/343 |
| | | | 701/426 |
| 2014/0053099 A1* | 2/2014 | Groten | G06T 19/006 |
| | | | 715/790 |
| 2015/0106011 A1* | 4/2015 | Nesbitt | G01C 21/3476 |
| | | | 701/412 |
| 2015/0112919 A1 | 4/2015 | Weir et al. | |
| 2016/0337275 A1* | 11/2016 | Hong | H04L 51/046 |
| 2017/0067748 A1* | 3/2017 | Glover | G01C 21/20 |

FOREIGN PATENT DOCUMENTS

| | | |
|---|---|---|
| JP | 2013-195235 | 9/2013 |
| JP | 2013-543157 | 11/2013 |
| JP | 2014-235597 | 12/2014 |
| JP | 2015-34767 A | 2/2015 |
| JP | 2015-81919 A | 4/2015 |

OTHER PUBLICATIONS

Notification of Reasons for Refusal dated Oct. 3, 2017, of corresponding Japanese Application No. 2016-052574, along with an English translation.

\* cited by examiner

FIG. 3

| POI NAME | NUMBER OF PIECES OF PROBE INFORMATION | INCREASE IN NUMBER OF PIECES OF PROBE INFORMATION | NUMBER OF PIECES OF VISIT INFORMATION | INCREASE IN NUMBER OF PIECES OF VISIT INFORMATION | DISTANCE FROM ROAD (M) | POPULARITY LEVEL |
|---|---|---|---|---|---|---|
| ... | ... | ... | ... | ... | ... | ... |
| A SHOP | 100,285 | 1,208 | 120,211 | 1,382 | 12 | 0.6735 |
| B PARK | 287,681 | 534 | 203,289 | 2,701 | 105 | 0.5267 |
| C RESTAURANT | 393,367 | 3,247 | 451,234 | 4,485 | 5 | 0.8340 |
| ... | ... | ... | ... | ... | ... | ... |

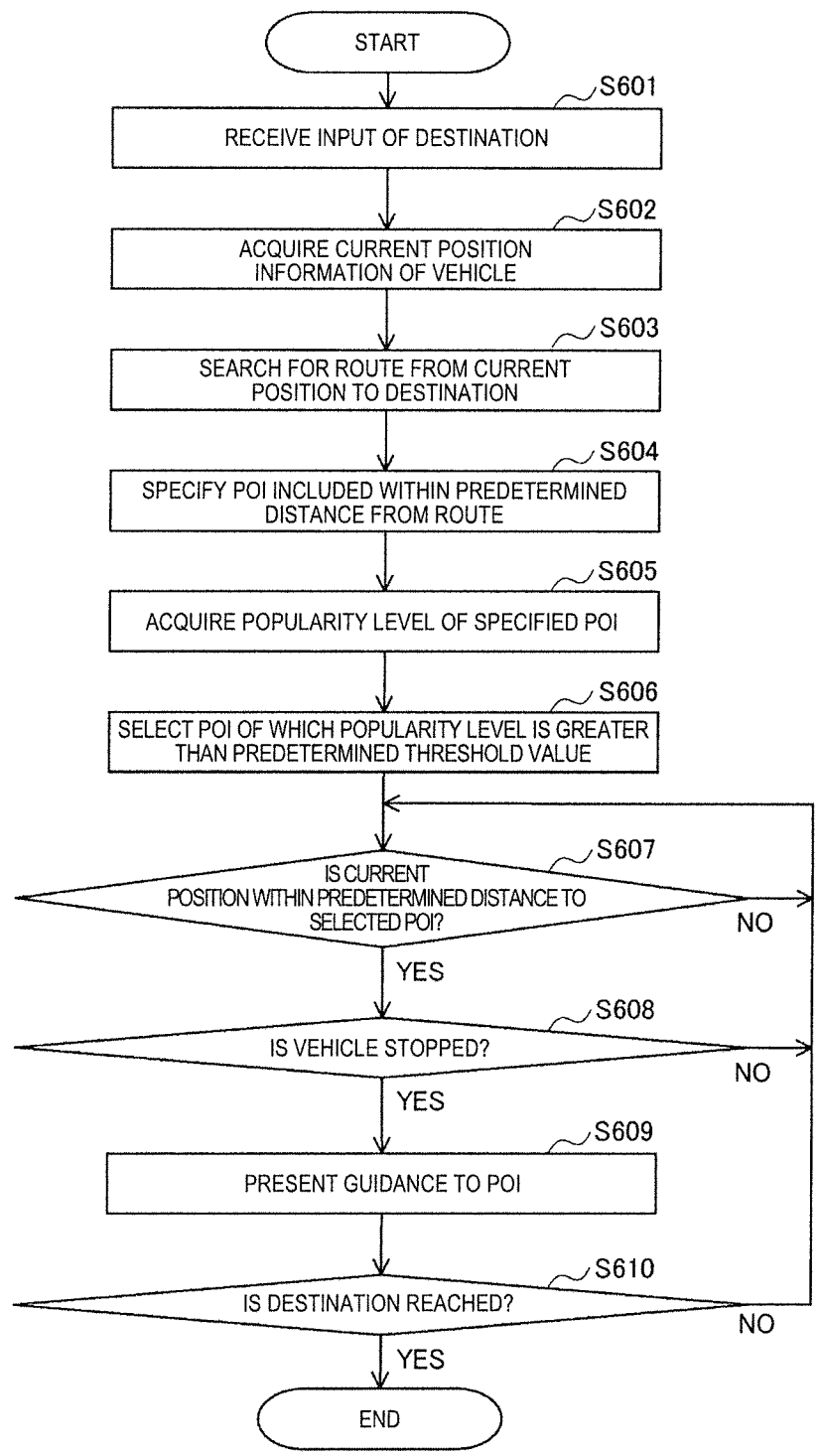

NAVIGATION SYSTEM, POI PRESENTATION METHOD, POI PRESENTATION PROGRAM, AND RECORDING MEDIUM

TECHNICAL FIELD

This disclosure relates to a navigation system, a point of interest (POI) presentation method, a POI presentation program, and a recording medium and, more particularly, to a navigation system, a POI presentation method, a POI presentation program, and a recording medium that present a POI.

BACKGROUND

Conventionally, a navigation system that can display point of interest (POI) information of a POI, which is a specific place or facility considered to be of use or interest to someone, on a monitor is known.

A navigation system that acquires POI data about a POI having a high popularity level within a predetermined range from a current position of a vehicle and displays an icon at a corresponding position on a map on a monitor so that the icon can be selected as a transit point candidate on the basis of the POI data is also known (for example, Japanese Patent Application Publication No. 2015-081919 (JP 2015-081919 A)). In the technique described in JP 2015-081919 A, a popularity level is calculated by collecting the number of persons visiting the POI using GPS receivers of smartphones or mobile phones.

As another technique of displaying a destination having a high popularity level, a technique of collecting evaluated values received via a web site from users and calculating a popularity level is also known (for example, Japanese Patent Application Publication No. 2015-034767 (JP 2015-034767 A)).

In the above-mentioned navigation system, when a POI is presented on the basis of a popularity level acquired using information from net users, there is a tendency for the popularity level of a POI located in a region which can be easily visited and used to be high. There is a problem in that the popularity level of a POI close to a city center is necessarily high and the popularity level of a POI located away from a city is relatively low.

It could therefore be helpful to provide a navigation system, a POI presentation method, a POI presentation program, and a recording medium that present a POI having a high popularity level suitable for each region.

SUMMARY

We thus provide a navigation system including: a search unit configured to search for a route to a destination; an acquisition unit configured to acquire a current position of a vehicle; a storage unit configured to store map information including information on a plurality of POIs; a collection unit configured to collect one or more types of popularity information for specifying a popularity level indicating a level of popularity of each POI; a calculation unit configured to calculate the popularity level of each POI on the basis of the popularity information collected by the collection unit; a specification unit configured to specify the POIs having high popularity levels which are located within a predetermined distance from the route searched for by the search unit; and a presentation unit configured to present one POI specified by the specification unit before traveling near the corresponding POI, wherein the calculation unit calculates the popularity level on the basis of a deviation value which is calculated on the basis of the one or more types of popularity information and popularity information on other POIs included within a first predetermined range from the corresponding POI.

Accordingly, the navigation system calculates a deviation value based on popularity information of other POIs within the first predetermined range from each POI, that is, around each POI, as the popularity level. Thus, the navigation system can calculate a popularity level with a suppressed deviation in the popularity level due to a regional difference and present a POI on the basis of the calculated popularity level.

BRIEF DESCRIPTION OF THE DRAWINGS

FIG. 3 is a diagram illustrating a data concept of POI information on popularity levels of POIs.

FIG. 6 is a flowchart illustrating a process of presenting a POI in the navigation system according to the example.

DETAILED DESCRIPTION

Hereinafter, a navigation system according to an example will be described in detail with reference to the accompanying drawings.

Configuration

Figure 1:
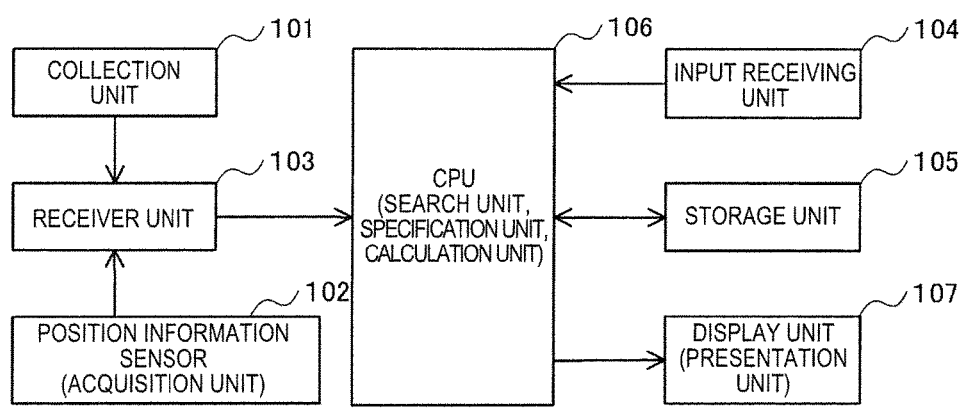
FIG. 1 is a block diagram illustrating a navigation system according to an example.

FIG. 1 shows a navigation system according to an example and includes a search unit 106 configured to search for a route to a destination, an acquisition unit 102 configured to acquire a current position of a vehicle, a storage unit 105 configured to store map information including information on a plurality of POIs, a collection unit 101 configured to collect one or more types of popularity information for specifying a popularity level indicating a level of popularity of each POI, a calculation unit (located in CPU 106) configured to calculate the popularity level of each POI on the basis of the popularity information collected by the collection unit, a specification unit (located in CPU 106) configured to specify the POIs having high popularity levels which are located within a predetermined distance from the route searched for by the search unit, and a presentation unit 107 configured to present one POI specified by the specification unit before traveling near the corresponding POI, and the calculation unit calculates the popularity level on the basis of a deviation value which is calculated on the basis of the one or more types of popularity information and popularity information on other POIs included within a first predetermined range from the corresponding POI. The navigation system will be specifically described below with reference to FIG. 1.

As illustrated in FIG. 1, the navigation system 100 includes a collection unit 101, a position information sensor 102, a receiver unit 103, an input receiving unit 104, a storage unit 105, a CPU 106, and a display unit 107. The navigation system 100 is used in a state in which the navigation system is mounted on a vehicle.

The collection unit 101 has functions of communicating with an external network and collecting popularity information used to calculate a popularity level of each POI. As long as it can communicate with an external network, the collection unit 101 may use any communication protocol. The popularity information has only to be an index to calculate a popularity level of a POI and examples thereof include the number of pieces of probe information indicating that an engine of a vehicle is started (or stopped) in the vicinity of the POI, an increase in the number of pieces of probe information within a predetermined period, the number of pieces of visit information indicating that the POI is visited, an increase in the number of pieces of visit information within a predetermined period, and a distance from a road of the POI.

The collection unit 101 has a function of properly receiving and collecting probe information including information indicating that an engine of a vehicle is started (or stopped) in the vicinity of a POI from an information provider or the like. The information provider or the like providing the probe information may be, for example, a service area or a gas station of an expressway in addition to a known vehicle maker or the like and the probe information may be received therefrom by wireless communication. Accordingly, the collection unit 101 can collect the probe information indicating that an engine of a vehicle is started (or stopped) in the vicinity of a POI and the navigation system 100 can store and update the collected probe information in the storage unit 105. When engines of vehicles are started (or stopped) in the vicinity of a POI, the possibility of visiting the POI increases and thus the number of pieces of probe information may be an index to calculate the popularity level of the POI. The probe information includes information on a date and time at which the probe information is uploaded to a center and thus an increase in the number of pieces of probe information within a predetermined period can be specified.

The collection unit 101 collects visit information indicating that a user visits a POI from a network. A user may upload information indicating that the user visits the POI, for example, to a blog or a page of a social network. This information may be referred to as check-in information. The collection unit 101 collects the check-in information indicating the visit to the POI and uploaded to the network.

Figure 2:
FIG. 2 is a diagram illustrating a map on which positions of POIs are marked.

The collection unit 101 collects information on a distance from a road of a POI with reference to map information 200 as shown in FIG. 2. Since the distance information is included in the map information, the CPU 106 may specify the distance from a road in the vicinity of the POI with reference to the map information stored in the storage unit 105. The collection unit 101 transmits the collected pieces of popularity information to the receiver unit 103.

The position information sensor 102 is a sensor that acquires current position information of a vehicle on which the navigation system 100 is mounted. Specifically, the position information sensor 12 is realized by a positioning system using various satellite radio waves such as the GPS or GNSS or an autonomous navigation system such as a gyroscope. The current position information may include at least latitude information and longitude information of a position of the vehicle and may include altitude information. The position information sensor 102 may acquire the current position information, for example, using a beacon installed on a road to acquire installation position information, and is not limited to the positioning system. The position information sensor 102 successively (or as necessary) acquires the position information from the outside or the current position information measured by the positioning system and transmits the acquired position information as the current position information to the receiver unit 103.

The receiver unit 103 has a function of transmitting the popularity information transmitted from the collection unit 101 and the current position information transmitted from the position information sensor 102 to the CPU 106.

The input receiving unit 104 receives an input from a user aboard a vehicle. The input receiving unit 104 may be realized, for example, by a touch panel along with the input receiving unit 104 or may be realized by a hardware key disposed in a housing of the navigation system 100. The input receiving unit 104 transmits input details received from the user to the CPU 106. The input receiving unit 104 receives destination information on a destination of the vehicle from the user and transmits the received destination information to the CPU 106.

The storage unit 105 is a recording medium that stores various programs required to operate the navigation system 100 and various data including map information. The storage unit 105 is, for example, a hard disk drive (HDD) or a solid state drive (SDD). The storage unit 105 stores the map information or POI information written from the CPU 106. The map information includes at least position information on lanes and position information on POIs (longitude information and latitude information). The map information includes link information in which roads are expressed by links and junctions of roads are expressed by nodes. The POI information includes information such as the number of pieces of probe information, an increase in the number of pieces of probe information, the number of pieces of visit information, an increase in the number of pieces of visit information, a distance from a road, and a popularity level of a POI for each POI. Details of the POI information will be described later.

The CPU 106 is a processor that performs processes which will be performed by the navigation system 100 using the programs and various data stored in the storage unit 105. The CPU 106 creates display information required for the course of navigation and displays the created display information on the display unit 107.

The CPU 106 serves as a search unit that searches for a route from a current position to a destination, a specification unit that specifies POIs having high popularity levels present within a predetermined distance from the searched-for route, and a calculation unit that calculates a popularity level of a POI.

The CPU 106 calculates a popularity level of each POI. For each POI, the CPU 106 calculates the popularity level on the basis of a deviation value of the number of pieces of probe information, a deviation value of the increase in the number of pieces of probe information, a deviation value of the number of pieces of visit information, a deviation value of the increase in the number of pieces of visit information, and a probability value serving as an index of popularity based on the distance from a road of the corresponding POI.

First, the CPU 106 specifies other POIs included within a first predetermined range (for example, a 5 km zone) from a POI of which the popularity level will be calculated. Then, the CPU 106 determines whether the number of other POIs specified is equal to or greater than a predetermined number. When the number of other POIs is not equal to or greater than the predetermined number, the CPU 106 extends the first predetermined range from the POI of which the popularity level will be calculated until the predetermined number of other POIs is included within the first predetermined range. In this way, other POIs included within the first predetermined range are specified.

Then, the CPU 106 acquires the number of pieces of probe information, an increase in the number of pieces of probe information, the number of pieces of visit information, an increase in the number of pieces of visit information, and a distance from a road of the POI of which the popularity level will be calculated from the POI information stored in the storage unit 105. Similarly, the CPU 106 acquires the numbers of pieces of probe information, the increases in the numbers of pieces of probe information, the numbers of pieces of visit information, the increases in the numbers of pieces of visit information, and the distances from roads of the specified other POIs from the POI information stored in the storage unit 105.

The CPU 106 calculates the deviation values of the POI of which the popularity level will be calculated for each piece of information acquired from the POI information. The CPU 106 calculates the deviation value of the number of pieces of probe information of the POI of which the popularity level will be calculated. When the number of pieces of probe information of the POI of which the popularity level will be calculated is defined as P, an average value of the number of pieces of probe information of the POI of which the popularity level will be calculated and the numbers of pieces of probe information of the other POIs included within the first predetermined range is defined as $A_{po}$, and a standard deviation of the number of pieces of probe information of the POI of which the popularity level will be calculated and the numbers of pieces of probe information of the other POIs included within the first predetermined range is defined as $S_{po}$, the deviation value $D_p$ based on the number of pieces of probe information of the POI of which the popularity level will be calculated can be calculated as in Equation (1). The deviation value $D_p$ can be adjusted to a value from 0 to 1 to match other indices.

$$D_p=(((P-A_{po})/S_{po})\times 10+50)/100 \quad (1)$$

Similarly, the CPU 106 also calculates the deviation values for the increase in the number of pieces of probe information, the number of pieces of visit information, and the increase in the number of pieces of visit information.

When the increase in the number of pieces of probe information of the POI of which the popularity level will be calculated is defined as PU, an average value of the increase in the number of pieces of probe information of the POI of which the popularity level will be calculated and the increases in the numbers of pieces of probe information of the other POIs included within the first predetermined range is defined as $A_{puo}$, and a standard deviation of the increase in the number of pieces of probe information of the POI of which the popularity level will be calculated and the increases in the numbers of pieces of probe information of the other POIs included within the first predetermined range is defined as $S_{puo}$, the deviation value $D_{pu}$ based on the increase in the number of pieces of probe information of the POI of which the popularity level will be calculated can be calculated as in Equation (2). The deviation value $D_{pu}$ can be adjusted to a value from 0 to 1 to match other indices.

$$D_{pu}=(((PU-A_{puo})/S_{puo})\times 10+50)/100 \quad (2)$$

When the number of pieces of visit information of the POI of which the popularity level will be calculated is defined as V, an average value of the number of pieces of visit information of the POI of which the popularity level will be calculated and the numbers of pieces of visit information of the other POIs included within the first predetermined range is defined as $A_{vo}$, and a standard deviation of the number of pieces of visit information of the POI of which the popularity level will be calculated and the numbers of pieces of visit information of the other POIs included within the first predetermined range is defined as $S_{vo}$, the deviation value $D_v$ based on the number of pieces of visit information of the POI of which the popularity level will be calculated can be calculated as in Equation (3). The deviation value $D_v$ can be adjusted to a value from 0 to 1 to match other indices.

$$D_v=(((V-A_{pvo})/S_{pvo})\times 10+50)/100 \quad (3)$$

When the increase in the number of pieces of visit information of the POI of which the popularity level will be calculated is defined as VU, an average value of the increase in the number of pieces of visit information of the POI of which the popularity level will be calculated and the increases in the numbers of pieces of visit information of the other POIs included within the first predetermined range is defined as $A_{vuo}$, and a standard deviation of the increase in the number of pieces of visit information of the POI of which the popularity level will be calculated and the increases in the numbers of pieces of visit information of the other POIs included within the first predetermined range is defined as $S_{vuo}$, the deviation value $D_{vu}$ based on the increase in the number of pieces of visit information of the POI of which the popularity level will be calculated can be calculated as in Equation (4). The deviation value can be adjusted to a value from 0 to 1 to match other indices.

$$D_{vu}=(((VU-A_{vuo})/S_{vuo})\times 10+50)/100 \quad (4)$$

The CPU 106 calculates a probability value serving as an index of a popularity level of a POI on the basis of the distance from the road of the POI. The probability value is set to increase as the distance from the road of the POI decreases and to decrease as the distance from the road of the POI increases and can be specifically calculated by Equation (5). When the distance from the road to the POI of which the popularity level will be calculated is defined as D(m), the popularity level (the probability value) Ds based on the distance can be calculated as follows.

$$Ds=f(D) \quad (5)$$

f(D) can be a function to convert the distance D into a probability value of 0<Ds<1 to get closer to 1 as the distance D decreases and to get closer to 0 as the distance D increases using the distance D from the road of the POI as an input. The function f can be, for example, using a logarithmic value of the distance D.

Then, the CPU 106 calculates the popularity level S of the POI as in Equation (6) using the values calculated by Equations (1) to (5).

$$S=D_p\times D_{pu}\times D_v\times D_{vu}\times Ds \quad (6)$$

The CPU 106 stores the popularity level S of each POI calculated in this way in the POI information of the storage unit 105.

The CPU 106 searches for a route from the current position of the vehicle based on the current position information transmitted from the receiver unit 103 to the destination based on the destination information input to the input receiving unit 104 by the user. It is assumed that, for example, Dijkstra's algorithm or an A-star algorithm is employed in the search for a route. At this time, the CPU 106 acquires fuel information on an amount of residual fuel to drive the vehicle and fuel consumption per unit time from the vehicle on which the navigation system 100 is mounted and searches for the route in a range in which the vehicle can reach the destination on the basis of the acquired fuel information. When fuel will run out before reaching the destination, the CPU 106 creates display information to present supply of fuel and displays the display information on the display unit 107.

The CPU 106 specifies POIs included within a predetermined range (for example, a 1 km zone) from the searched-for route. The CPU 106 acquires the popularity levels of the specified POIs from the POI information 300. The CPU 106 compares the acquired popularity levels of the POIs to a predetermined threshold value and selects the POIs having a popularity level equal to or greater than the predetermined threshold value. Then, the CPU 106 creates display information that recommends the selected POIs as guidance spots and displays the display information on the display unit 107.

The display unit 107 is a monitor that displays display information transmitted from the CPU 106 and is, for example, a liquid crystal display (LCD), an organic electronic luminescence (EL) display, or a plasma display. The display unit 107 may be a touch panel along with the input receiving unit 104. Configuration of the navigation system 100 has been described above.

Data

FIG. 2 is a conceptual diagram visually illustrating an example of a relationship between a map and POIs as the map information 200.

As illustrated in FIG. 2, the map information 200 includes an arrangement of roads (links), a connection relationship thereof, and positional coordinates of the POIs, and the POIs are correlated with the map information. In FIG. 2, POIs 201 to 203 representative of the POIs are referenced. Only some POIs are referenced for the purpose of easy understanding of the drawing, and a location of each POI is expressed by O and a straight line.

FIG. 3 is a data concept diagram illustrating the configuration of the POI information 300 stored in the storage unit 105. As illustrated in FIG. 3, the POI information 300 is information in which a POI name 301, the number of pieces of probe information 302, an increase in the number of pieces of probe information 303, the number of pieces of visit information 304, an increase in the number of pieces of visit information 305, a distance from a road 306, and a popularity level 307 are correlated with each other.

The POI name 301 is information indicating a name of a POI to identify each POI.

The number of pieces of probe information 302 is a numerical value obtained by summing the counted number of pieces of probe information indicating that an engine is stopped within a predetermined range (for example, 100 m) from the corresponding POI. When an engine is stopped within the predetermined range, it indicates that there is a high possibility that a user will visit the corresponding POI and this information is considered to be used as information to calculate the popularity level of the POI.

The increase in the number of pieces of probe information 303 is a numerical value obtained by summing the number of pieces of probe information indicating that an engine is stopped within a predetermined range from the corresponding POI from the current time to a predetermined period in the past. An index to calculate the recent popularity level of the POI is acquired from the information on the increase in the number of pieces of probe information.

The number of pieces of visit information 304 is a numerical value obtained by summing the number of times information indicating that a user visits the corresponding POI is uploaded to a network or the like and, for example, a numerical value obtained by summing the number of pieces of check-in information using an SNS is employed.

The increase in the number of pieces of visit information 305 is a numerical value obtained by summing the counted number of pieces of visit information indicating the number of times information indicating that a user visits the corresponding POI is uploaded to a network or the like from the current time to a predetermined period in the past. An index to calculate the recent popularity level of the POI is acquired from the information on the increase in the number of pieces of visit information.

The distance from a road (link) 306 is distance information indicating a distance from a road closest to the corresponding POI. The distance may be expressed in meters.

The popularity level 307 is a numerical value indicating a degree of popularity of the corresponding POI and is information indicating the popularity level of the POI calculated by the navigation system 100 on the basis of the number of pieces of probe information 302, the increase in the number of pieces of probe information 303, the number of pieces of visit information 304, and the increase in the number of pieces of visit information 305. Since each index is calculated as a probability level, the popularity level may be set to have a value from 0 to 1.

In the example of the POI information 300 illustrated in FIG. 3, for example, the number of pieces of probe information 302 of "C Restaurant" is "393,367," the increase in the number of pieces of probe information 303 is "3,247," the number of pieces of visit information 304 is "451,234," the increase in the number of pieces of visit information 305 is "4,485," and the distance from a road 306 is "5 m." The popularity level 307 of "C Restaurant" calculated on the basis of this information is "0.834."

Operation

Figure 4:
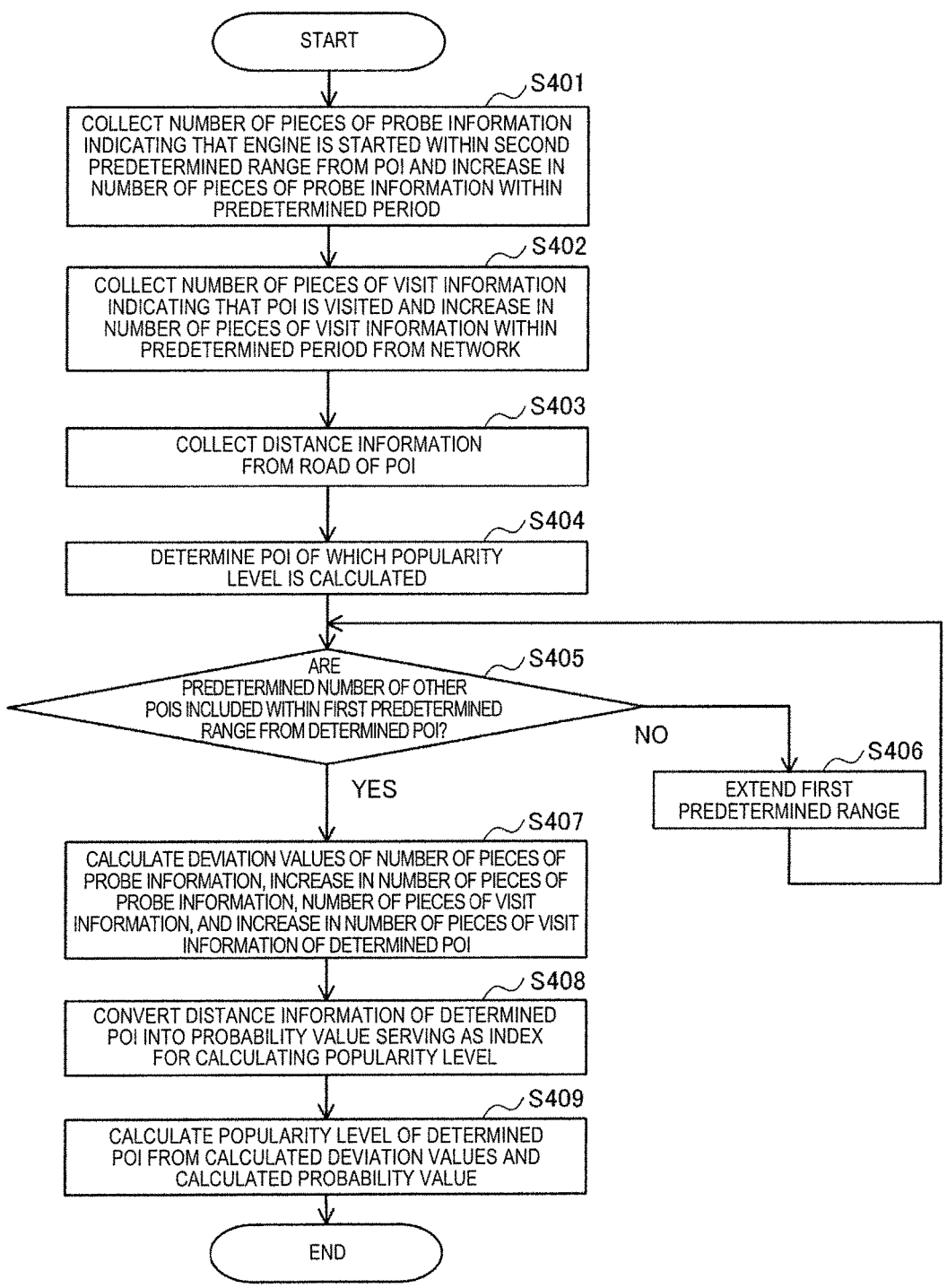
FIG. 4 is a flowchart illustrating a process of calculating a popularity level of a POI in the navigation system according to the example.

FIG. 4 is a flowchart illustrating operations of a popularity level calculating process when the navigation system 100 calculates a popularity level of a POI. This is a process of determining the popularity level 307 illustrated in FIG. 3. The process illustrated in FIG. 4 is periodically (for example, once a week) performed by the navigation system 100 and the popularity levels of the POI information 300 are updated.

The collection unit 101 collects the number of pieces of probe information indicating that an engine is started (or stopped) within a second predetermined range from the corresponding POI and an increase in the number of pieces of probe information within a predetermined period for each POI (Step S401). The collection unit 101 transmits the collected information to the CPU 106 via the receiver unit 103, and the CPU 106 stores the transmitted information in the corresponding number of pieces of probe information 302 and the corresponding increase in the number of pieces of probe information 303 of the POI information 300.

The collection unit 101 collects the number of pieces of visit information indicating that a user visits the corresponding POI and the increase in the number of pieces of visit information within a predetermined period from the network for each POI (Step S402). The collection unit 101 transmits the collected information to the CPU 106 via the receiver unit 103, and the CPU 106 stores the transmitted information in the corresponding number of pieces of visit information 304 and the corresponding increase in the number of pieces of visit information 305 of the corresponding POI of the POI information 300.

The collection unit 101 collects information on a distance from a road of the corresponding POI for each POI (Step S403). The collection unit 101 transmits the collected information to the CPU 106 via the receiver unit 103, and the CPU 106 stores the transmitted information in the distance from the road of the corresponding POI 306 of the POI information 300.

Then, the CPU 106 of the navigation system 100 determines a POI of which the popularity level will be calculated (Step S404).

The CPU 106 determines whether a predetermined number of other POIs are included within the first predetermined range from the determined POI (Step S405). When the predetermined number of other POIs are not included within the first predetermined range (NO in Step S405), the CPU 106 extends the first predetermined range by a predetermined distance from the determined POI (Step S406) and then performs Step S405 again.

Figure 5A:
FIGS. 5A and 5B are conceptual diagrams illustrating an example in which a reference range is extended in calculating deviation values of the popularity levels of POIs.
Figure 5B:

FIGS. 5A and 5B are conceptual diagrams illustrating an example in which the first predetermined range is extended. As illustrated in FIG. 5A, the first predetermined range 501 is determined to be centered on the POI 500 of which the popularity level will be calculated. When the predetermined number of POIs are not included within the first predetermined range 501, the CPU 106 extends the first predetermined range in a direction indicated by an arrow in the drawing from the range indicated by a dotted line 501 to a position indicated by a solid line 502 as illustrated in FIG. 5B. The extended distance at this time is set to a predetermined distance (for example, 100 m).

When the first predetermined range is extended until the predetermined number of other POIs are included, the CPU 106 calculates the deviation values of the number of pieces of probe information, the increase in the number of pieces of probe information, the number of pieces of visit information, and the increase in the number of pieces of visit information of the POI of which the popularity level is determined to be calculated using Equations (1) to (4) (Step S407).

The CPU 106 converts the distance information of the POI of which the popularity level is determined to be calculated into a probability value serving as an index to calculate the popularity level using Equation (5) (Step S408).

Then, the CPU 106 calculates the popularity level of the POI from the calculated deviation values and the calculated probability value using Equation (6) (Step S409). The CPU 106 stores the calculated popularity level in the popularity level 307 of the corresponding POI of the POI information 300.

The CPU 106 calculates the popularity level for each POI included in the POI information 300 and ends the processing routine.

FIG. 6 is a flowchart illustrating operations of a POI presenting process when the navigation system 100 presents POIs having a high popularity level to a user.

The input receiving unit 104 of the navigation system 100 receives an input of a destination from a user (Step S601). The input receiving unit 104 transmits destination information indicating the received destination to the CPU 106.

The position information sensor 102 acquires the current position information of the vehicle (Step S602). The position information sensor 102 transmits the acquired current position information to the receiver unit 103, and the receiver unit 103 transmits the transmitted current position information to the CPU 106.

The CPU 106 searches for a route from the current position indicated by the current position information to the destination indicated by the destination information on the basis of the transmitted destination information and the transmitted current position information (Step S603).

The CPU 106 specifies POIs included within the predetermined distance from the route acquired by search (Step S604). This can specify the POIs included in a range extended by a predetermined distance (for example, 500 m) to the right and left sides in the traveling direction from the searched-for route.

The CPU 106 acquires the popularity levels of the specified POIs from the POI information 300 (Step S605).

The CPU 106 selects POIs having a popularity level greater than a predetermined threshold value among the specified POIs (Step S606).

The CPU 106 successively receives the current position information from the position information sensor 102 via the receiver unit 103. Then, the CPU 106 determines whether the current position of the vehicle is within a predetermined distance to any of the selected POIs (Step S607).

When the CPU 106 determines that the current position of the vehicle is within a predetermined distance to any of the selected POIs (YES in Step S607), the CPU 106 determines whether the vehicle is stopped (Step S608). This determination may be performed, for example, depending on whether the current position indicated by the transmitted current position information moves, or may be performed by receiving information indicating whether vehicle wheels rotate in cooperation with a vehicle driving system.

When it is determined that the vehicle is stopped (YES in Step S608), the CPU 106 creates display information to present guidance to the selected POIs and transmits the display information to the display unit 107. Then, the display unit 107 displays the transmitted display information (Step S609).

Figure 7:
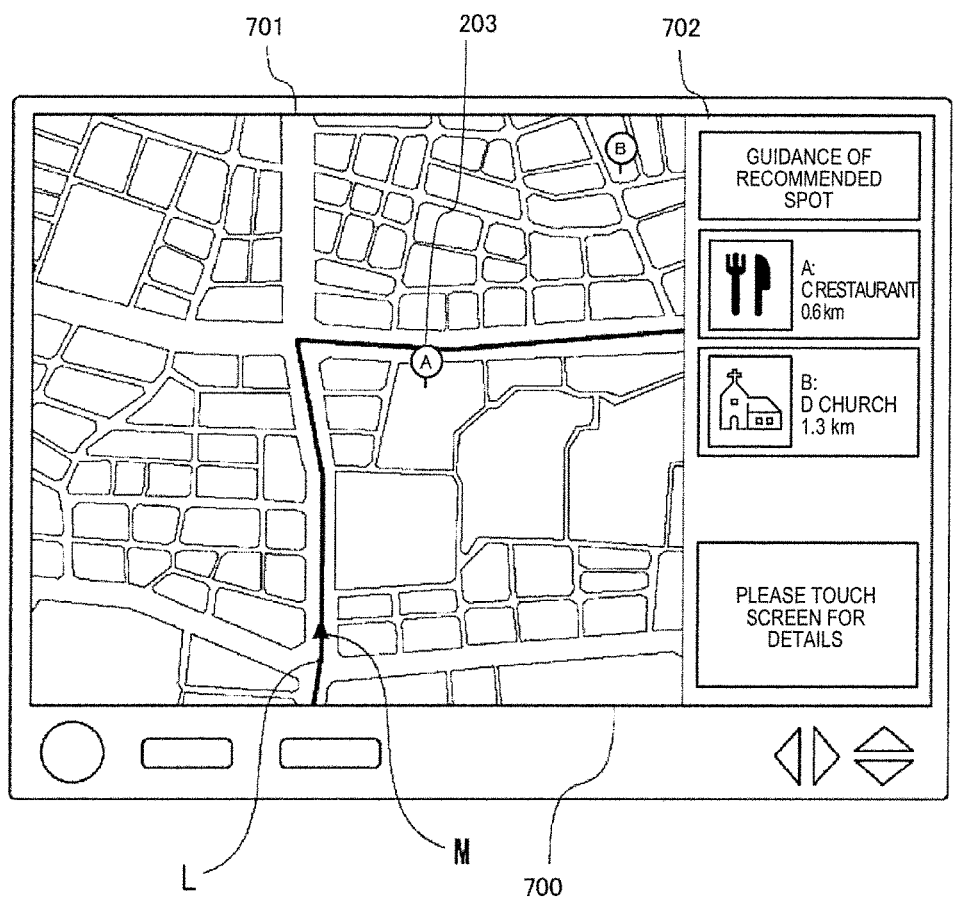
FIG. 7 is a diagram illustrating an example in which a POI is displayed in the navigation system.

The display unit 107 displays a guidance screen 700 to recommend a POI having a high popularity level, for example, as illustrated in FIG. 7. A map 701 and POI guidance information 702 are displayed on the guidance screen 700. A position M of the vehicle and the searched-for route L are displayed on the map 701. Then, guidance to the POI 203 having a high popularity level which may be visited along the route L, distance information thereto and the like are displayed. Although not illustrated, detailed information on the POI may be displayed when a user touches the POI in which he or she is interested.

When information on the POI having a high popularity level is displayed, the CPU 106 determines whether the vehicle reaches the destination (Step S610). This determination is performed depending on whether the current position indicated by the current position information transmitted from the position information sensor 102 matches the destination indicated by the destination information.

When it is determined that the vehicle reaches the destination (YES in Step S610), the navigation system 100 ends the processing routine.

When the CPU 106 determines that the current position is not within the predetermined distance to any of the selected POIs in Step S607 (NO in Step S607), when the CPU 106 determines that the vehicle is not stopped in Step S608 (NO in Step S608), or when the CPU 106 determines that the vehicle does not reach the destination in Step S610 (NO in Step S610), the CPU 106 returns the processing routine to Step S607.

Operation of the navigation system 100 according to the example have been described above.

Conclusion

The navigation system 100 according to the example calculates the deviation values within the first predetermined range of the information (the number of pieces of probe information, the increase in the number of pieces of probe information, the number of pieces of visit information, and the increase in the number of pieces of visit information) serving as a source to calculate the popularity level of a POI. Accordingly, a POI having a high popularity level can be specified in each region. The navigation system 100 according to the example can present a POI having a high popularity level and suitable for visiting by a vehicle using the number of pieces of probe information indicating that an engine is started (or stopped) in the vicinity of the POI as an index for calculating the popularity level.

Reference Examples

An example of our navigation system has been described above, but the spirit and scope of this disclosure is not limited to the example. Various reference examples included in the spirit and scope of this disclosure will be described below:

(1) In the above-mentioned example, the popularity level is calculated on the basis of the multiplied value of the deviation value of the number of pieces of probe information, the deviation value of the increase in the number of pieces of probe information, the deviation value of the number of pieces of visit information, the deviation value of the increase in the number of pieces of visit information, and the probability value based on the distance from a road (link) of the corresponding POI.

However, the popularity level calculating process described above is only an example, and any of the four deviation values and the probability value may not be used, at least one thereof may be used as the popularity level, or a multiplied value of at least two thereof may be calculated as the popularity level.

In the above-mentioned example, the multiplied value of the deviation values of the pieces of information and the probability value is used, but as long as these values are reflected in the popularity level, a calculation method other than the multiplication may be employed and, for example, an added value may be used.

(2) In the above-mentioned example, the first predetermined range is set to a circular shape, but as long as the POI of which the popularity level will be calculated is included in the first predetermined range, the first predetermined range may have a shape other than the circular shape and, for example, a rectangular shape may be used.

(3) In the above-mentioned example, the first predetermined range is extended to spread in all directions from the POI of which the popularity level will be calculated, but this disclosure is not limited thereto. The first predetermined range is preferably extended from the POI of which the popularity level will be calculated, but another extension method such as a method of extending the first predetermined range from one point in the first predetermined range which is set as a fixed point may be used.

(4) In the above-mentioned example, the first predetermined range is extended until a predetermined number of other POIs are included in the first predetermined range, but this disclosure is not limited thereto. The number of POIs may be small in some regions. In this case, an upper limit of extension may be determined such that the first predetermined range is not excessively widened. When a predetermined number of POIs are not included in the range in spite of extension to the upper limit, the navigation system 100 calculates the popularity level on the basis of the information on the POIs included in the first predetermined range extended to the upper limit.

(5) In the above-mentioned example, the navigation system 100 presents a recommended POI when the vehicle is stopped, but this disclosure is not limited thereto. Even when the vehicle on which the navigation system 100 is mounted travels, a recommended POI may be presented as long as it does not interfere with the user's driving.

(6) In the above-mentioned example, the navigation system 100 calculates the popularity levels of POIs, but a system other than the navigation system 100 may calculate the popularity levels of the POIs. That is, an external server may calculate the popularity levels of the POIs by performing the processing routine illustrated in FIG. 4 and the navigation system 100 may acquire the popularity levels calculated by the external server from the external server and perform the process of presenting a recommended POI, which is illustrated in FIG. 6.

(7) In the above-mentioned example, the navigation system 100 is a so-called car navigation system mounted on a vehicle for use, but this disclosure is not limited thereto. The navigation system 100 may be, for example, a portable terminal (such as a smartphone, a mobile phone, or a portable game machine) connected to a vehicle for use.

Figure 8:
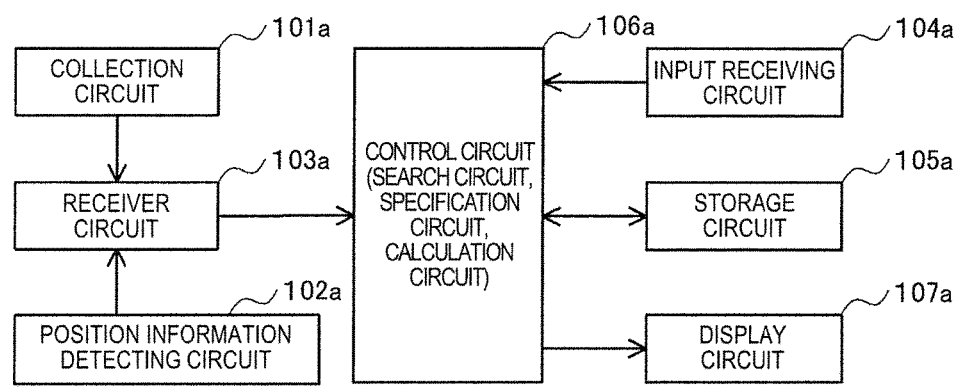
FIG. 8 is a block diagram illustrating a configuration of the navigation system according to the example.

(8) In the above-mentioned example, the functional units of the navigation system 100 may be a logical circuit (hardware) or a dedicated circuit formed on an integrated circuit (IC) chip or a large scale integration (LSI) chip to realize the functions of the units, or may be software using a central processing unit (CPU) and a memory. The functional units may be one or more integrated circuits or the functions of two or more functional units may be realized by a single integrated circuit. The LSI may be referred to as a VLSI, a super LSI, an ultra LSI, or the like depending on a difference in a degree of integration. For example, as illustrated in FIG. 8, the navigation system 100 may include a collection circuit 101*a*, a position information detecting circuit 102*a*, a receiver circuit 103*a*, an input receiving circuit 104*a*, a storage circuit 105*a*, a control circuit 106*a*, and a display circuit 107*a*. Each circuit may be configured to have the same function to correspond to the unit having the same name in the above-mentioned example.

When the functional units of the navigation system 100 are software, the navigation system 100 includes a CPU that executes commands of a navigation program which is software that realizes the functions, a read only memory (ROM) or a storage device (which are referred to as a "recording medium") in which the navigation program and various data are stored in a computer (or CPU)-readable manner, and a random access memory (RAM) into which the navigation program is loaded. We can cause the computer (or the CPU) to read and execute the navigation program from the recording medium. As the recording medium, a "non-transitory physical medium" such as a tape, a disc, a card, a semiconductor memory, or a programmable logical circuit can be used. The navigation program may be supplied to the computer via an arbitrary transmission medium (such as a communication network or broadcast waves) which can transmit the navigation program. It is possible to provide data signals buried in carrier waves in which the navigation program is electronic transmission.

The navigation program may be mounted, for example, using a script language such as ActionScript or JavaScript (registered trademark), an object-oriented programming language such as Objective-C or Java (registered trademark), or a markup language such as HTML5.

(9) While our systems, methods, programs and media have been described above on the basis of the accompanying drawings and the example, it should be noted that those skilled in the art can easily change or modify those items in various forms on the basis of the above-mentioned disclosure. Accordingly, it should be noted that such change or modification is included in the scope of this disclosure and the appended claims. For example, the functions included in respective means and respective steps can be rearranged as long as there is no logical contradiction, two or more means or steps may be combined into a single means or step, or a single means or step may be divided.

(10) The configurations described in the above-mentioned examples and various modified examples may be appropriately combined.

What is claimed is:

1. A navigation system comprising:
   a search unit configured to search for a route to a destination;
   an acquisition unit configured to acquire a current position of a vehicle;
   a storage unit configured to store map information including information on a plurality of POIs;
   a collection unit configured to collect one or more types of popularity information for specifying a popularity level indicating a level of popularity of each POI;
   a calculation unit configured to calculate the popularity level of each POI on the basis of the popularity information collected by the collection unit;
   a specification unit configured to specify the POI having high popularity levels which are located within a predetermined distance from the route searched for by the search unit; and
   a presentation unit configured to present one POI specified by the specification unit before traveling near the corresponding POI,
   wherein the calculation unit calculates the popularity level on the basis of a deviation value which is calculated on the basis of the one or more types of popularity information and popularity information on other POIs included within a first predetermined range from the corresponding POI,
   the calculation unit extends the first predetermined range to include a predetermined number of other POIs and calculates the deviation value when the predetermined number or more of other POIs are not present within the first predetermined range;
   the collection unit collects distance information to a road of the corresponding POI as one piece of the one or more types of popularity information,
   the calculation unit calculates the popularity level additionally on the basis of the distance information; and
   the calculation unit calculates the popularity level on the basis of a probability value which is set such that the popularity level decreases as a distance to the road of the corresponding POI increases and the popularity level increases as the distance decreases.

2. The navigation system according to claim 1, wherein the calculation unit calculates the popularity level additionally on the basis of the number of pieces of popularity information.

3. The navigation system according to claim 1, wherein the calculation unit calculates the popularity level of the corresponding POI on the basis of an integrated value of at least two of the number of pieces of the one or more types of popularity information, the deviation value for each type calculated on the basis of the one or more types of popularity information, and the probability value.

4. The navigation system according to claim 1, wherein the collection unit collects probe information indicating that an engine of the vehicle is started or stopped within a second predetermined range, which is a range in which the popularity information is collected, from the corresponding POI as one piece of the one or more types of popularity information.

5. The navigation system according to claim 1, wherein the collection unit collects an increase in the number of pieces of probe information indicating that an engine of the vehicle is started or stopped within a predetermined period within a second predetermined range from the corresponding POI as one piece of the one or more types of popularity information.

6. The navigation system according to claim 1, wherein the collection unit collects visit information indicating that the corresponding POI is visited as one piece of the one or more types of popularity information from a network.

7. The navigation system according to claim 1, wherein the collection unit collects an increase in the number of pieces of visit information indicating that the corresponding POI is visited within a predetermined period as one piece of the one or more types of popularity information.

8. The navigation system according to claim 6, wherein the visit information is input information indicating that users of a social networking service visit the corresponding POI.

9. The navigation system according to claim 7, wherein the visit information is input information indicating that users of a social networking service visit the corresponding POI.

10. A POI presentation method comprising:
    searching for a route to a destination;
    acquiring a current position of a vehicle;
    storing map information including information on a plurality of POIs in a storage unit;
    collecting one or more types of popularity information for specifying a popularity level indicating a level of popularity of each POI;
    calculating the popularity level of each POI on the basis of the collected popularity information;
    specifying the POIs having high popularity levels which are located within a predetermined distance from the searched-for route; and
    presenting one specified POI before traveling near the specified POI,
    wherein the calculating of the popularity level includes calculating the popularity level on the basis of a deviation value which is calculated on the basis of the one or more types of popularity information and popularity information on other POIs included within a first predetermined range from the corresponding POI,
    the calculating extends the first predetermined range to include a predetermined number of other POIs and calculates the deviation value when the predetermined number or more of other POIs are not present within the first predetermined range;
    the collecting collects distance information to a road of the corresponding POI as one piece of the one or more types of popularity information, the calculating calculates the popularity level additionally on the basis of the distance information; and the calculating calculates the popularity level on the basis of a probability value which is set such that the popularity level decreases as a distance to the road of the corresponding POI increases and the popularity level increases as the distance decreases.

11. A non-transitory recording medium having stored thereon a POI presentation program which causes a computer to perform:

searching for a route to a destination;

acquiring a current position of a vehicle;

storing map information including information on a plurality of POIs in a storage unit;

collecting one or more types of popularity information for specifying a popularity level indicating a level of popularity of each POI;

calculating the popularity level of each POI on the basis of the collected popularity information;

specifying the POIs having high popularity levels which are located within a predetermined distance from the searched-for route; and presenting one specified POI before traveling near the specified POI, wherein the calculating of the popularity level includes calculating the popularity level on the basis of a deviation value which is calculated on the basis of the one or more types of popularity information and popularity information on other POIs included within a first predetermined range from the corresponding POI, the calculating extends the first predetermined range to include a predetermined number of other POIs and calculates the deviation value when the predetermined number or more of other POIs are not present within the first predetermined range;

the collecting collects distance information to a road of the corresponding POI as one piece of the one or more types of popularity information, the calculating calculates the popularity level additionally on the basis of the distance information; and the calculating calculates the popularity level on the basis of a probability value which is set such that the popularity level decreases as a distance to the road of the corresponding POI increases and the popularity level increases as the distance decreases.

* * * * *